United States Patent [19]

Shelby

[11] 4,184,310

[45] Jan. 22, 1980

[54] SEALED CONTAINER AND METHOD OF MAKING THE SAME

[76] Inventor: Richard K. Shelby, 160 Briarwood North, Oak Brook, Ill. 60521

[21] Appl. No.: 893,762

[22] Filed: Apr. 5, 1978

[51] Int. Cl.$^2$ .................... B65B 7/28; B65B 61/18; B67B 3/04

[52] U.S. Cl. ........................... 53/412; 53/420; 53/442; 53/488; 53/297; 53/133

[58] Field of Search ............... 53/329, 412, 420, 488, 53/478, 442, 297, 133

[56] References Cited

U.S. PATENT DOCUMENTS

| | | | |
|---|---|---|---|
| 3,354,604 | 11/1967 | Amberg et al. | 53/329 X |
| 3,354,605 | 11/1967 | Amberg et al. | 53/412 |
| 3,507,093 | 4/1970 | Marion | 53/329 X |
| 3,590,554 | 7/1971 | Carter | 53/329 X |
| 3,838,550 | 10/1974 | Mueller | 53/488 X |
| 4,011,119 | 3/1977 | Mitchell et al. | 53/488 X |
| 4,035,987 | 7/1977 | Nakazato et al. | 53/329 X |

Primary Examiner—Horace M. Culver

[57] ABSTRACT

A sealed container is formed by positioning a length of heat shrinkable film above the open top of a container, grasping a corner of the film, and heat shrinking the peripheral portion of the film into fluid tight compressive engagement with the upper portion of the container while the film corner is grasped. The unshrunk gripped corner of the film provides a pull tab for removing the closure, when desired. As the peripheral portion of the film is heat shrunk, the remainder of the film is tensioned across the open top of the container, and minute perforations are then formed in the tensioned film to define frangible sections which may be ruptured by a straw when the contents of the container are to be consumed with the closure in place.

6 Claims, 6 Drawing Figures

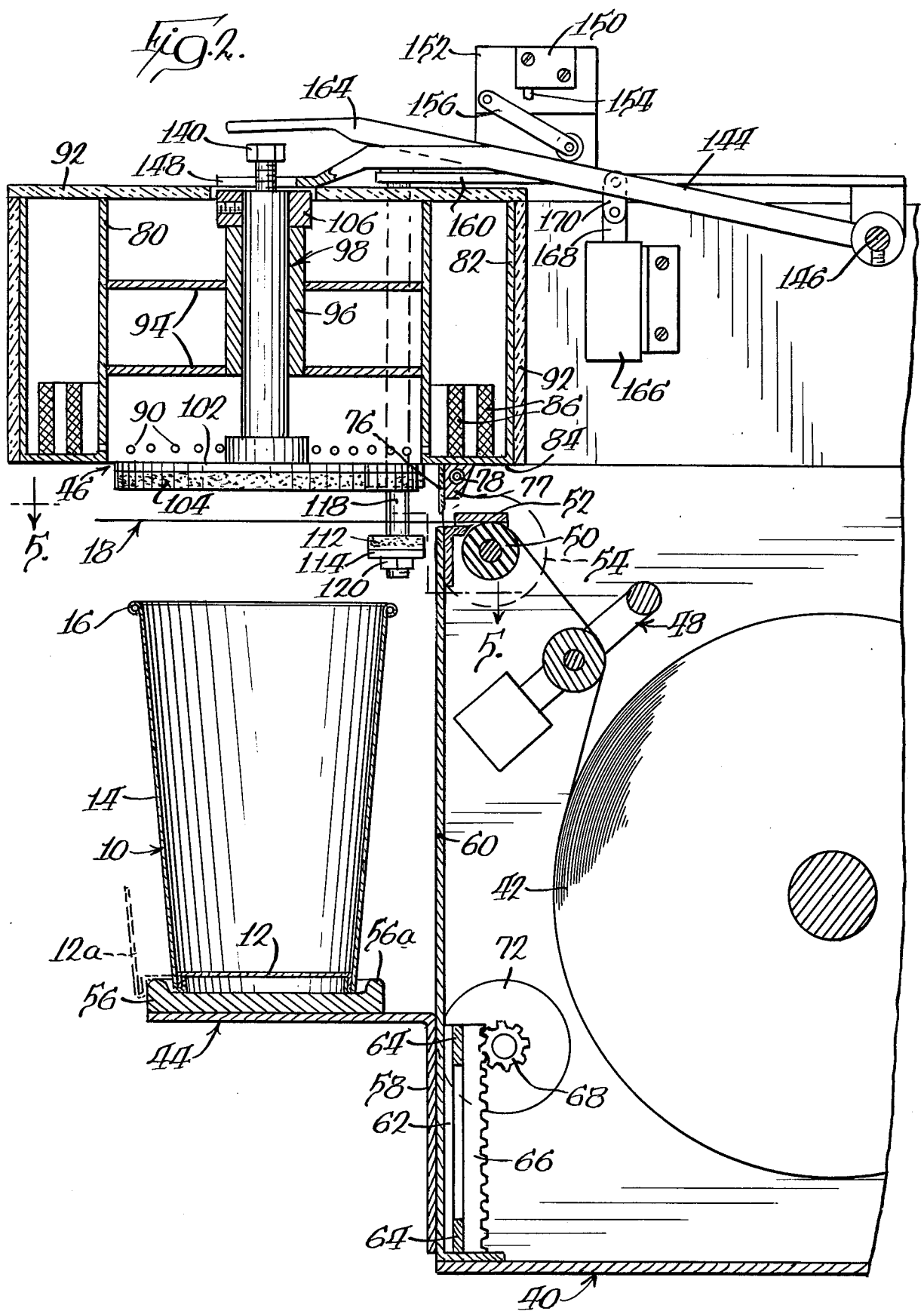

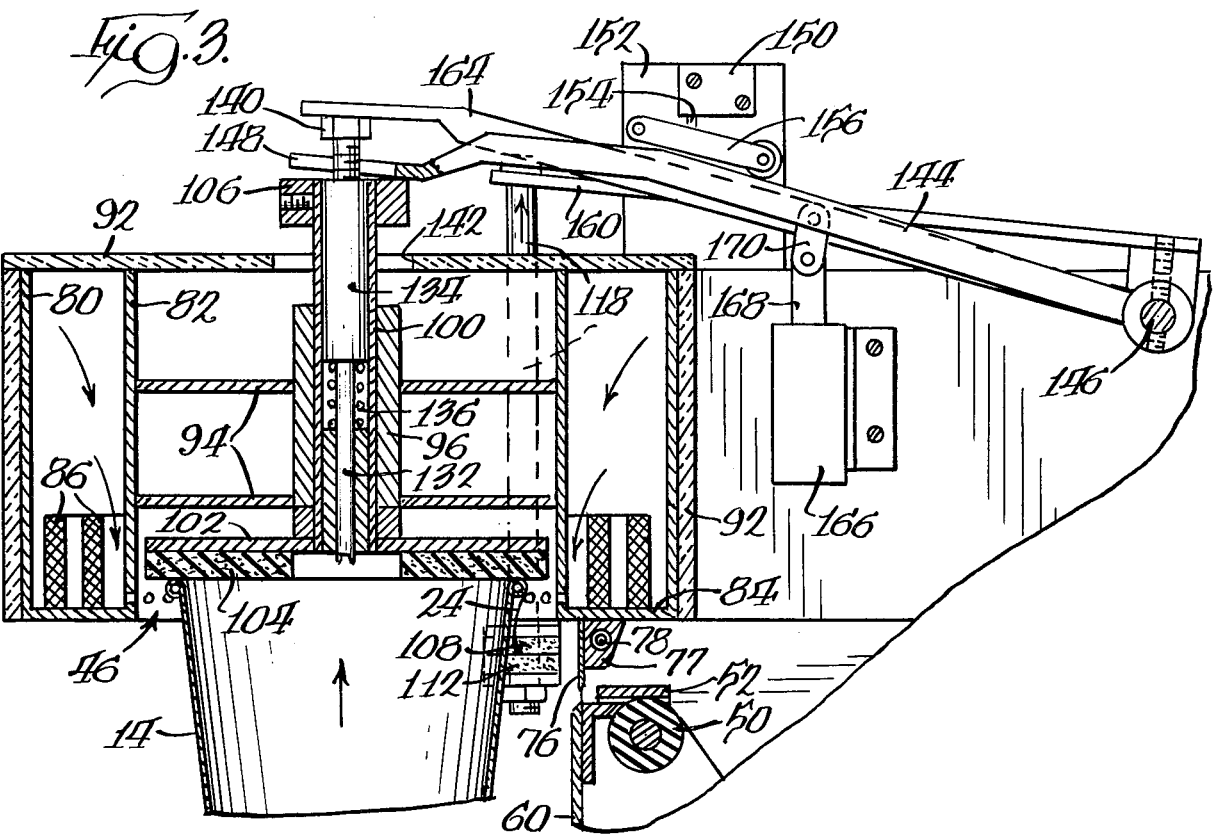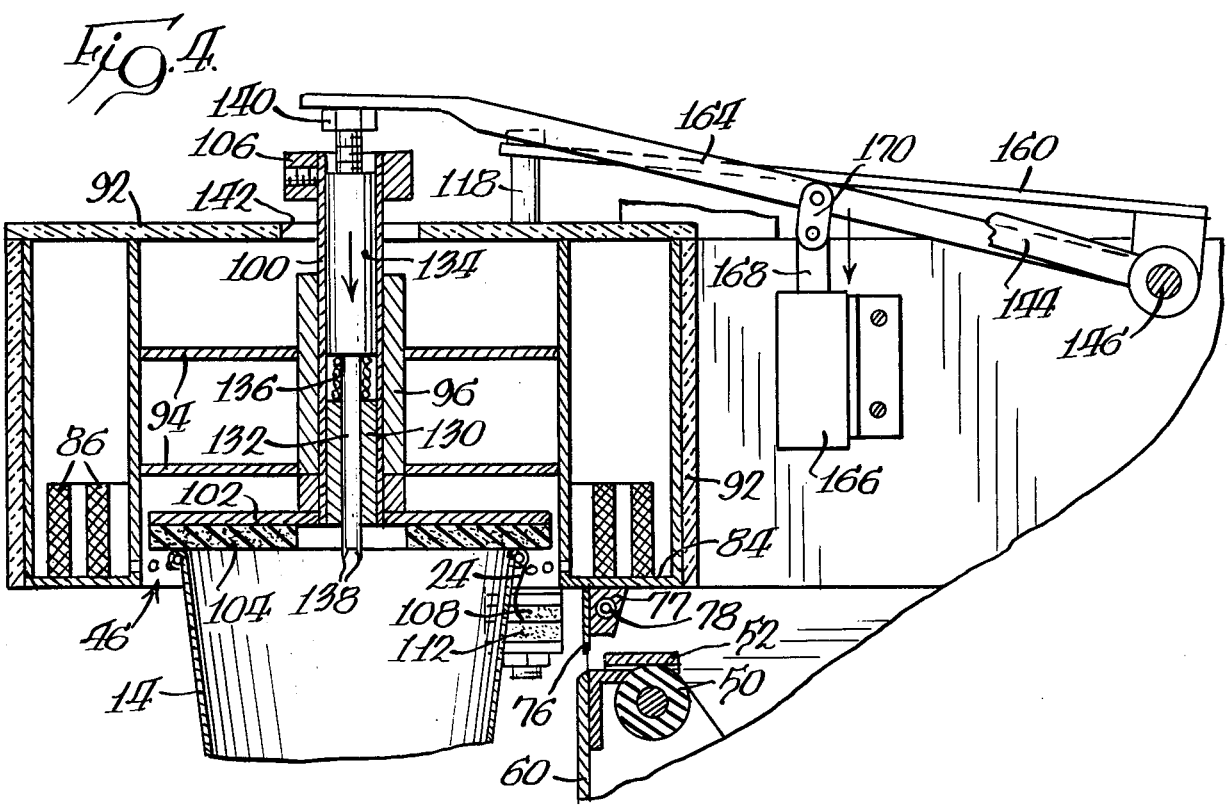

SEALED CONTAINER AND METHOD OF MAKING THE SAME

BACKGROUND OF THE INVENTION

This invention relates generally to containers for comestibles, and more particularly to containers for liquid comestibles; such as, soft drinks, sodas, milk shakes and the like.

It is a conventional practice today to provide containers of the type described above with a plastic lid that embraces the lip that is formed at the upper end of the container sidewall, with the lid being pre-punched to provide a means for accepting a drinking straw so that the contents of the container can be consumed with the lid in place. While such lidded containers are in widespread common use today, many problems are associated therewith, not the least of which is that the relatively rigid, thick-gage plastic lids are expensive. And, particularly in fast food restaurants, some difficulties are encountered in properly seating the lids on the containers. Furthermore, the cutouts that are provided in the lids for accepting a straw have a tendency to leak, if the container is inadvertently knocked over.

Thus, there is a need to provide a less expensive closure arrangement, one which can be easily and quickly applied, which will accept a straw, and which will not leak. p It has also been proposed in the past to form closures for comestibles and the like out of heat shrunk plastic film. Typical containers, methods and machines are disclosed in U.S. Pat. Nos. 3,014,320, 3,257,769 3,354,604, 3,354,605, 3,460,317, and 3,508,380. Since such closures are aesthentically unattractive, have a tendency to leak, and do not accept a drinking straw, to date they have not provided a viable alternative to lidded containers, particularly in fast food restaurants.

SUMMARY OF THE INVENTION

The present invention provides an improved heat shrunk closure for a container adapted to hold a liquid comestible product, which closure includes a skirt that is heat shrunk into fluid tight compressive engagement with the upper end of the container and which is provided with a single triangularly shaped gripping tab for ready removal of the closure from the container. The gripping tab is formed by grasping a corner of a severed blank of heat-shrinkable film and holding it away from the heated air during the heat shrinking operation.

When the peripheral portion of the blank of heat-shrinkable material is shrunk, the portion of the closure spanning the open end of the container is tensioned. After the heat shrinking takes place, a plunger means is actuated to provide a plurality of minute perforations in the tensioned portion of the film. The minute perforations define a frangible zone which may be readily ruptured by a drinking straw, and the perforations are dimensioned such that the contents of the container will not leak, if the container is inverted or accidentially tipped over.

BRIEF DESCRIPTION OF THE DRAWINGS

FIG. 2 is a fragmentary cross-sectional view taken generally along line 2—2 of FIG. 2;

FIG. 3 is a fragmentary sectional view similar to FIG. 2, but showing the container elevated into a heat shrinking position;

FIG. 4 is a fragmentary cross-sectional view similar to FIGS. 2 and 3, and illustrating the formation of the perforations in the closure;

DETAILED DESCRIPTION OF THE INVENTION

Figure 1:
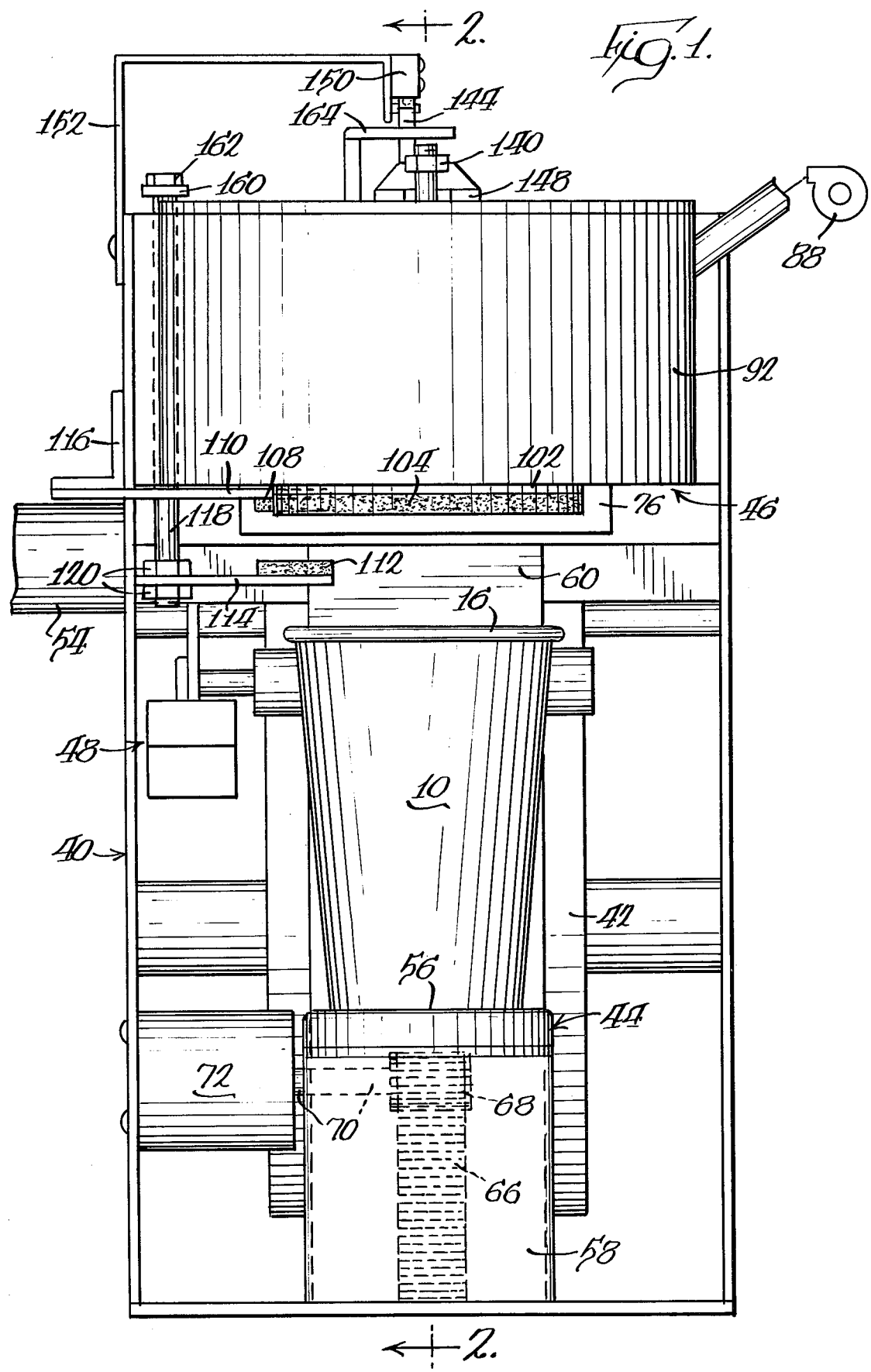
FIG. 1 is a front elevational view of an embodiment of apparatus for carrying out the method of the present invention and producing the container of the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Figure 5:
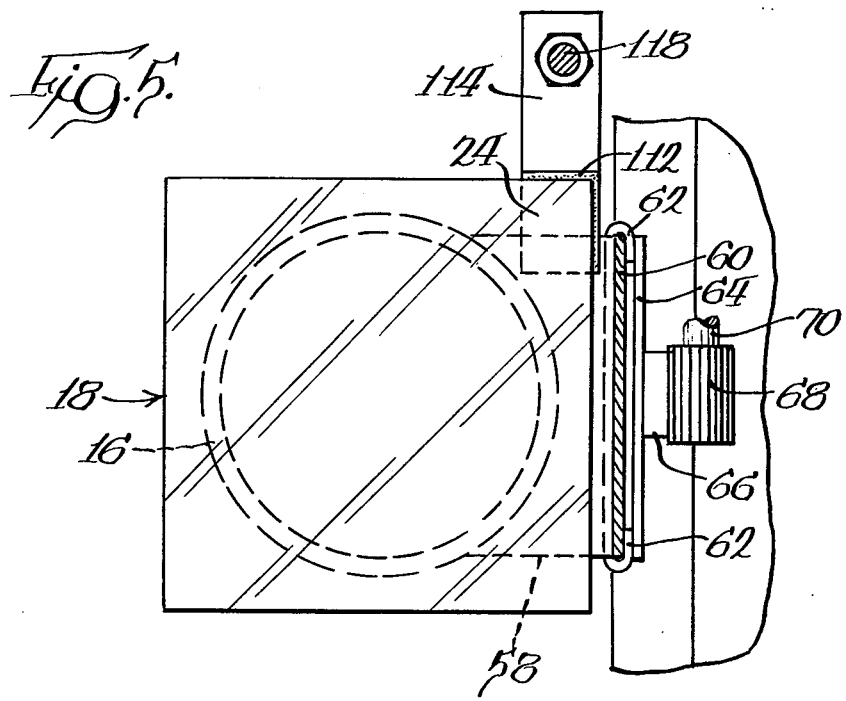
FIG. 5 is a cross-sectional view taken generally along line 5—5 of FIG. 2.
Figure 6:
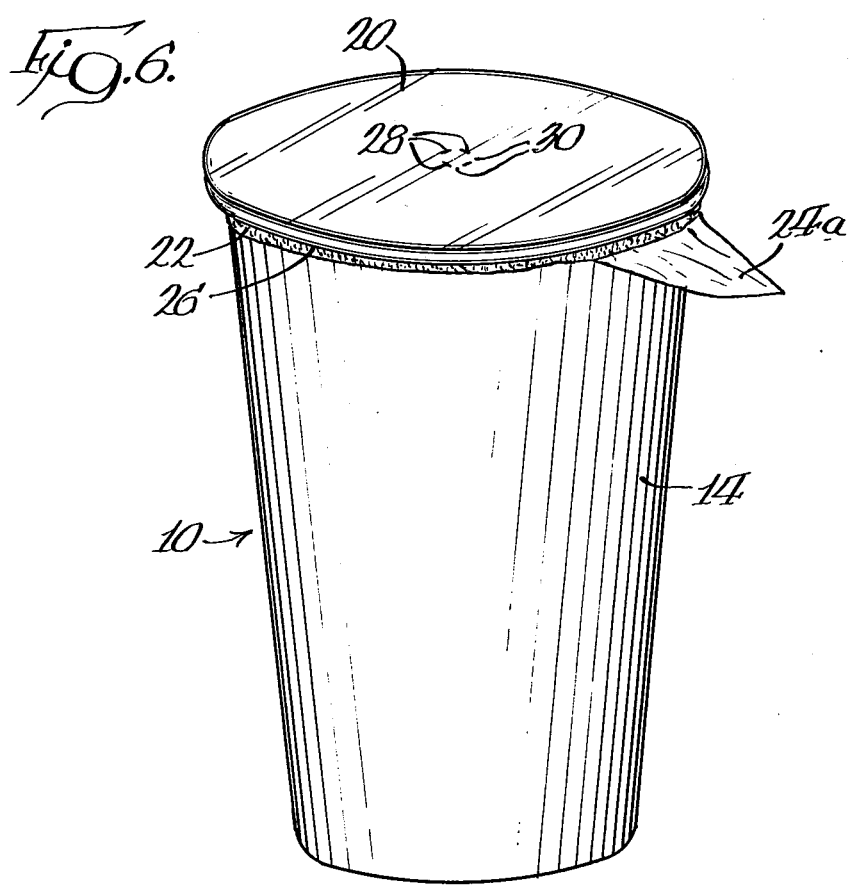
FIG. 6 is an enlarged perspective view of the container of the present invention.

The container of the present invention is indicated in its entirety at 10 in the drawings, and can be best understood from a consideration of FIG. 6. Container 10 is of the type that is adapted to hold a beverage, such as a soft drink, or milk shake, and includes a circular base 12 (FIG. 2), and a frustoconically shaped sidewall 14 extending upwardly and outwardly from base 12 and terminating in an open upper end surrounded by an inturned bead or lip 16. In accordance with the present invention, after the contents have been placed in container 10, a removable closure is sealed thereto. The closure is formed from a blank 18 (FIG. 5) of heat-shrinkable material and, as will become evident from the following description, blank 18 is a square member that is severed from a continuous film supply, and positioned in superposed relationship with respect to the open upper end of container 10 after which the peripheral portion of blank 18 extending beyond the open top of the container is shrunk into snug, fluid tight, compressive engagement with bead 16 and the upper end of sidewall 14 immediately below bead 16. During the shrinking operation, the blank 18 is relatively unrestrained, so that as the peripheral portion of the blank is shrunk, the film section 20 spanning the open top of the container is tensioned. The shrunken peripheral portion of the blank 18 defines a skirt 22 which, as mentioned above, embraces the undersurface of lip 16, as well as the sidewall portion immediately below.

The closure may be shrunk into conformity with the top of the container by application of heated air to the peripheral portion of the blank, and during this operation, gripping means to be hereafter described in detail holds a corner 24 of the blank 18 away form the heated air, so that this portion of the blank is not shrunk. As a result, a generally triangularly shaped pull tab 24a of unshrunken plastic material is provided integrally with the container closure for ready removal of the closure when desired.

Shrunken skirt 22 extends circumferentially continuously around the top of the container 10, and pull tab 24 extends outwardly from the bottom of the skirt 22 generally at right angles to the container sidewall. As such, a readily visable and manually accessible pull tab is provided.

In accordance with another feature of the present invention, skirt 22 is selectively thickened at locations spaced 90° circumferentially around the periphery of the container by virtue of the application of heated air to the three other corners of the blank 18 other than corner 24. As noted above, the application of heat to the peripheral portion of the blank around the complete circumference of the container while the blank 18 is free to move relative to the container permits the shrink energy of the film to stretch the blank causing the blank to tightly engage the upper edge of bead 16. During the heat-shrinking operation the central portion of the blank that is tensioned across the mouth of the container is shielded from the heated air.

After the peripheral portion of the blank has been shrunk, and the remainder of the blank tensioned, a series of minute perforations 28 are provided in the central tensioned region of the closure to define frangible zone 30 therebetween, which may be readily ruptured by a drinking straw, if it is desired to consume the contents of container 10 without removing the closure. In a preferred embodiment of the invention, four perforations 28 are provided, with the perforations being arcuate in shape and defined concentrically about the axis of the container. Perforations 28 are dimensioned so that the fluid contents of the container will not leak in the event that the container is inverted or tipped over after the closure has been applied thereto.

The apparatus for forming the sealed container 10 includes a housing 40 having a roll of film 42 (FIG. 2) rotatably mounted therein. A container platform 44 is mounted on the front face of housing 40 for vertical reciprocal movement toward and away from a heating chamber 46, and as is evident from FIG. 2, film 42 is guided into superposed relationship above a film container 10 on platform 44 and below heating chamber 46. As is also evident from FIG. 2, film from roll 42 is fed upwardly over a weighted, pivotally mounted tension applying roller assembly 48, between film drive roller 50 and backup member 52 and outwardly of the housing into position above container platform assembly 44 and below heating chamber 46. Film drive roller 50 is rotated in a counterclockwise direction, as viewed in FIG. 2, by a motor 54 (FIG. 1) mounted externally of housing 40. As can be seen in FIG. 2, the length of film that is fed outwardly of the housing is completely unsupported above the container 10, and conventional timer means is provided for controlling the duration of operation of motor 54 so that an appropriate amount of film is fed outwardly in centered relationship with respect to container 10.

Container platform 44 includes a cup shaped member 56 for receiving the base of the container, and for centering the container relative to the heating chamber 46. Member 56 includes an upstanding peripheral flange 56a, and base 12 of smaller diameter containers is seated within flange 56a as shown in full lines in FIG. 2, while base 12 of larger diameter containers fits over flange 56a, as shown in broken lines in FIG. 2. Container platform 44 also includes an L-shaped member 58 having a horizontal leg with container holder 56 thereon and a vertical leg positioned in face abutting engagement with a vertical frame member 60 associated with housing 40. As is shown in FIG. 5, the side edges 62 of the vertical portion of L-shaped member 58 are folded over into embracing engagement with the side edges of frame member 60 to mount and guide the platform 44 for vertical movement relative to heating chamber 46. Spaced transverse members 64 are secured to side edges 62, and carry a rack 66 having vertically disposed teeth facing inwardly of chamber 40. A pinion 68 meshes with rack 66, and is carried by a shaft 70 associated with a drive motor 72 for reciprocating the platform 44. Motor 72 is connected in an appropriate electrical circuit with a manual control, such as a push button, which also initiates energization of motor 54 to feed a length of film into position above a container as it is being lifted.

A knife 76 is mounted beneath heating chamber 46, and knife 76 includes a downwardly facing film rupturing edge,. Knife 76 is mounted at one side of a heating chamber 77 having a heating element 78 thereon. As platform 44 is reciprocated upwardly from the container loading position illustrated in FIG. 2 toward the heat-shrinking position of FIG. 3, the upper edge of the container lifts the film out of the film feed path and upwardly into engagement with the downwardly facing knife edge to sever length 18 from the film supply.

Heating chamber 46 is provided at the lower end of concentrically arranged cylindrical walls 80 and 82 which are spanned at their lower end by bridging portion 84. One or more heater elements 86 may be mounted bridging portion 84, and air from a blower 88 (FIG. 1) is heated by heaters 86 and directed outwardly through circumferentially spaced openings 90 at the lower end of wall 82 for heating the peripheral portion blank 18 will hereinafter appear. It should be understood that air heated by heaters 86 may also be directed into chamber 77 and used to heat knife 76, if it is desired to eliminate separate heater 78. Insulating members 92 may be provided above walls 80 and 82, and outwardly of wall 80.

A pair of spaced support plates 94 are secured to wall 82, and a sleeve 96 is secured within central apertures in plates 94. A plunger assembly 98 is mounted for reciprocal movement relative to heating chamber 46, and the plunger assembly includes a stem 100 disposed within sleeve 96. An enlarged plate 102 is carried by the lower end of stem 100, and plate 102 is dimensioned so as to be larger than the upper end of container 10, but smaller than the diameter of heating chamber 46. Plate 102 is gravity biased outwardly of heating chamber 46 to the position of FIG. 2 and a resilient pad 104 is provided on the bottom of plate 102 for lightly engaging the film therebeneath. Plate 102 and pad 104 function as a heat sink by shielding the film from the heated air during the heat shrinking operation. Pad 104 may be eliminated and plate 102 formed of a smooth plastic material so that the film will not be clamped between the plate and the upper end of the container. This permits the unheated central region of the film to be tensioned as the peripheral portion of the film is heat shrunk. A collar 106 is secured to the upper end of plunger 100 and bears against the upper end of sleeve 96 to locate the plate 102 in the position of FIG. 2.

The means for grasping corner 24 of the film blank 18 includes an upper fixed gripper pad 108 carried by a support 110 and a movable gripper pad 112 carried by a support arm 114. Gripper pads 108 and 112 are preferably formed of an elastomeric material so as to firmly engage and hold the film corner 24 against movement as heated air is applied to the remainder of the peripheral portion of the blank 18. As is evident from FIGS. 1-4, support arm 110 retains pad 108 in a position spaced below heating chamber 46. Support arm 100 my be secured to frame 40 in any suitable fashion, such as by bracket 116 (FIG. 1).

A vertical rod 118 is adjustably secured to support arm 114 by nuts 120, and extends upwardly through a guide opening in support arm 110. Rod 118 is moved by a linkage means, to be hereafter described, in response to movement of platform 44, so that when the platform 44 is raised from the container receiving position of FIGS. 1 and 2, movable pad 12 moves into positive film gripping engagement with fixed pad 108, as is shown in FIGS. 3 and 4. When the container has been elevated to the position of FIGS. 3 and 4, rim 16 is disposed slightly above openings 90, and heated air passing outwardly of openings 90 shrinks the peripheral portion of blank 18 into fluid tight compressive engagement with the upper end of the container. The gravity bias of plate 102 is sufficiently light to permit the shrinking of the peripheral film portion to tension the film against the open top of the container. If desired, pad 104 may be eliminated, and the plate formed of a smooth, solid heat resistant plastic or metal to facilitate tensioning of the film.

The means for forming minute perforations 28 in the container closure are mounted within sleeve 100. To this end, a hollow guide sleeve 130 is fixed within the lower end of sleeve 100, and slidably receives therewithin a film piercing element 132. Film piercing element 132 includes a large diameter upper end 134 that is slidably disposed within sleeve 100, and a compression spring 136 is disposed between sleeve 130 and the upper portion 134 of the film piercing element to bias the same upwardly. The lower end of film piercing element 132 includes a plurality of circumferentially spaced sharpened projections 138 which pass through the tensioned central region 20 of the film to form the perforations 28 when the film piercing element is moved from the position of FIG. 3 to the position of FIG. 4. A set screw 140 extends upwardly from the film piercing member 132 for engagement with a solenoid actuated linkage system to be hereafter described in detail.

When a container is moved from the loading position of FIGS. 1 and 2 to the heat-shrinking position of FIG. 3, collar 106 at the uper end of sleeve 100 passes upwardly through a clearance opening 142 in top insulating member 92. A first arm 144 has an inner end fixed to a transversely extending, horizontally disposed shaft 146 that is pivotally mounted upon housing 40. The opposite end of arm 144 is branched at 148 to span set screw 140 and bears against the upper insulating member 92 in the container loading position of FIGS. 1 and 2. When the container is moved into the heat shrinking position of FIG. 3, collar 106 engages the end 148 of arm 144 to pivot arm 144 and shaft 146 in a clockwise direction. A microswitch 150 is mounted above housing 140 by bracket 152, and microswitch 150 includes a plunger actuator 154 disposed above arm 144. An actuating arm 156 is pivotally mounted on bracket 152 above arm 154, and as the arm 144 is pivoted in a clockwise direction from the position of FIG. 2 to the position of FIG. 3, switch actuating arm 156 engages plunger 154 to actuate switch 150. Switch 150 is connected in the aforementioned electrical circuit with platform elevating motor 72, and terminates energization of motor 72 when a container 10 reaches the position shown in FIG. 3. Switch 150 also energizes blower 88 for a fixed time period sufficient to shrink the peripheral portion of the film blank, and by having the blower inactive except when a container is positioned with its closure to be shrunk, substantial energy savings are effected. Also the need for complicated damper arrangements commonly used in the past to control the flow of heated air is eliminates. The electrical circuit may include an appropriate timing device, as will be readily apparent to those skilled in the art, for reversing motor 72 to lower the platform 44 to the position shown in FIGS. 1 and 2, after the expiration of a fixed time period. During the fixed time period, the film piercing member 132 is actuated to form the perforations 28 in the tensioned container closure.

A second arm 160 has its inner end fixed to shaft 146, and its opposite end secured to the upper end of rod 118 by nut 162. Like arm 144, arm 160 is also pivoted in a clockwise direction to the position shown in FIG. 3 when a container is elevated into the heat-shrinking position. This latter movement brings movable gripping pad 112 into positive film gripping relationship with fixed gripping pad 108.

A third arm 164 has its inner end loosely received on shaft 146, and its outer end positioned in alignment with set screw 140. A solenoid 166 is mounted upon housing 40, and includes an upwardly extending plunger 168 that is connected by a link 170 to the mid-portion of arm 164. When a container moves into the heat shrinking position of FIG. 3, set screw 140 engages the end of arm 164 to pivot the same in a clockwise direction, and switch 150 is connected by appropriate electric circuit to solenoid 166, so that the solenoid is energized when the switch 150 is actuated thus retracting plunger 168 and causing link 170 to pivot the arm 166 in a counterclockwise direction whereupon the free end of arm 164 reciprocates the film piercing member 132 from the position of FIG. 3 to the position of FIG. 4 to form the perforations 28 in the tensioned container closure. Solenoid 166 is deenergized, shortly after the switch 150 is energized by appropriate means in the aforementioned electrical circiut, or by movement of the container downwardly toward the position of FIG. 2 to deenergize switch 150, spring 136 returns the film piercing member 132 from the position of FIG. 4 to the position of FIG. 3. As a sealed container moves downwardly toward the position of FIG. 2, rod 118 pivots arm 160 in a counterclockwise direction to pivot shaft 146 and return arm 144 to the position shown in FIG. 2. The apparatus is then positioned so that the operational sequence can be repeated.

I claim:

1. The method of forming a closure in an open top container comprising the steps of: feeding a length of heat-shrinkable film into superposed relationship with respect to the open top of said container, said length of film being larger than the open top of said container whereby corners of said film project beyond the periphery of said open top, effecting relative movement between said length of film and said container so that the upper end of the container is positioned in engagement with said length of film with portions of the film being disposed outwardly of the periphery of the open top of the container, grasping only a single corner of the outwardly extending film portion, applying heat to the outwardly extending film portions completely around the periphery of the container to heat shrink the film into compressive engagement with the upper end of the container completely around the periphery thereof to thereby form a closure, said grasping step being performed at least during a portion of said heat applying step whereby heat shrinking of the grasped film corner is retarded, and releasing the grasped film corner to provide a single pull tab for said closure.

2. A method as set forth in claim 1 wherein said grasping step is performed in response to the effecting of relative movement between the length of film and container.

3. A method as set forth in claim 2 wherein said grasping step is performed by moving a first clamping pad into film gripping relationship with respect to a second fixed clamping pad.

4. The method of forming a closure in an open top container comprising the steps of: providing a continuous supply of heat-shrinkable film, feeding a length of said film into superposed relationship with respect to the open top of said container, said length of film being larger than the open top of said container whereby corners of said film project beyond the periphery of said open top, effecting relative movement between said length of film and said container so that the upper end of the container is positioned in engagement with said length of film with portions of the film being disposed outwardly of the periphery of the open top of the container, severing said length of film from said supply in response to said relative movement, grasping only a single corner of the outwardly extending film portion in response to said relative movement and holding it below the top of the container, applying heat to the outwardly extending film portions completely around the periphery of the container to tension the severed length of film across the open top of the container and to heat shrink the film into compressive engagement with the upper end of the container completely around the periphery thereof to thereby form a closure, said grasping step being performed at least during a portion of said heat applying step whereby heat shrinking of the grasped film corner is retarded, forming a series of minute perforations in said tensioned film to define frangible film portions adapted to be ruptured by a straw, and releasing the grasped film corner to provie a single pull tab for said closure.

5. The method of forming a closure in an open top container comprising the steps of: providing a continuous supply of heat-shrinkable film, feeding a length of said film below a heating chamber and into superposed relationship with respct to the open top of said container, moving said container upwardly so that the upper end of the container is positioned in engagement with said length of film with portions of the film being disposed outwardly of the periphery of the open top of the container, severing said length of film from said supply in response to movement of said container, grasping a section of the outwardly extending film portion in response to movement of said container and holding it below the top of the container, continuing the upward movement of said container to position the upper end of the container in said heating chamber, applying heat in such heating chamber to the outwardly extending film portions completely around the periphery of the container to tension the severed length of film across the open top of the container and to heat shrink the film into compressive engagement with the upper end of the container completely around the periphery thereof to thereby form a closure, said grasping step being continued while said heat applying step is performed whereby the grasped film section is not shrunk, forming a series of minute perforations in said tensioned film to define frangible film portions adapted to be ruptured by a straw, moving said container downwardly to remove the upper end of the container from the heating chamber, and releasing the grasped film section in response to downward movement of the container to provide a pull tab for said closure.

6. A method as set forth in claim 5 wherein said step of forming minute perforations is performed by moving a perforating element into engagement with said tensioned film while the upper end of the container is positioned in said heating chamber.

* * * * *